United States Patent [19]
Akabane

[11] Patent Number: 5,490,071
[45] Date of Patent: Feb. 6, 1996

[54] METHOD FOR ADJUSTING GOVERNOR ACTUATOR IN TRACTION CONTROL SYSTEM

[75] Inventor: Tetsuo Akabane, Higashimatsuyama, Japan

[73] Assignee: Jidosha Kiki Co., Ltd., Tokyo, Japan

[21] Appl. No.: 262,022

[22] Filed: Jun. 17, 1994

[30] Foreign Application Priority Data

Jun. 21, 1993 [JP] Japan .................... 5-148985

[51] Int. Cl.$^6$ .................... B60K 28/16; F02D 31/00
[52] U.S. Cl. .................... 364/426.02; 364/431.07; 123/357; 123/396; 180/171
[58] Field of Search .................... 364/426.03, 426.02, 364/424.05, 431.04, 431.07, 431.12; 180/197, 171, 178; 303/113.2, 93, 112, 113.4, 115.1, 115.4; 123/340, 351, 357, 396, 419

[56] References Cited

U.S. PATENT DOCUMENTS

| | | | |
|---|---|---|---|
| 4,335,624 | 6/1982 | Garman et al. | 74/482 |
| 4,523,564 | 6/1985 | Sturdy | 123/361 |
| 4,531,489 | 7/1985 | Sturdy | 123/320 |
| 4,757,791 | 7/1988 | Hachitani et al. | 123/357 |
| 4,915,072 | 4/1990 | Caron et al. | 123/357 |
| 5,224,044 | 6/1993 | Tamura et al. | 364/426.03 |
| 5,235,950 | 8/1993 | Schmitt et al. | 123/396 |
| 5,279,382 | 1/1994 | Iwata | 180/197 |

*Primary Examiner*—Kevin J. Teska
*Assistant Examiner*—Tan Q. Nguyen
*Attorney, Agent, or Firm*—Varndell Legal Group

[57] ABSTRACT

An ABS/TRC ECU 22, when an adjustment indicating signal is input thereto, reciprocates a governor actuator 21 to recognize a mechanical actuation range of the governor actuator 21. Also, the ABS/TRC ECU 22 sets a stroke lower limit position A of the governor actuator 21 in view of the amount of offset of the governor actuator depending on a vehicle, to thereby determine a servo position of a governor link 20 during maximum deceleration at the time of TRC corresponding to the position A. Then, the ABS/TRC ECU 22 adds the amount of effective stroke of the governor actuator 21 to the position A to set a stroke upper limit position B of the governor actuator 21 and determines a servo position of the governor link 20 during minimum deceleration at the time of TRC corresponding to the upper limit position. Data on positional control of the governor actuator 21 determined are stored in a memory of the ABS/TRC ECU 22. This permits adjustment of the governor link to be facilitated and workability in the adjustment to be improved without any specific parts and skill.

16 Claims, 3 Drawing Sheets

METHOD FOR ADJUSTING GOVERNOR ACTUATOR IN TRACTION CONTROL SYSTEM

BACKGROUND OF THE INVENTION

This invention relates to a method for adjusting a governor actuator in a traction control system, and more particularly to a method for adjusting a governor actuator for actuation and control of a governor link adjusting an output of an engine of a vehicle in a traction control system which is adapted to adjust drive power of drive wheels of the vehicle to prevent waste of power of the engine due to slipping of the drive wheels at the time of start or quick acceleration of the vehicle and ensure positive start and acceleration of the engine.

In an automobile industry, an anti skid brake control (hereinafter also referred to as "ABS") system has been developed which is adapted to adjust brake force to prevent locking of brake wheels during braking of a vehicle. Also, a traction control (hereinafter also referred to as "TRC") system has been conventionally proposed which is adapted to adjust driving force of drive wheels of the vehicle to minimize power loss of an engine during slipping of the drive wheels and more effectively transmit driving force of the drive wheels to a road surface to promote propulsion of the vehicle.

Such an ABS/TRC system may be constructed, for example, in such a manner as shown in FIG. 2. More particularly, the ABS/TRC system generally includes a pair of wheel speed sensors 3 and 4 for detecting wheel speed of a pair of front wheels 1 and 2 each acting as a non-drive wheel; a modulator 5 for adjusting a brake pressure of the front wheels 1 and 2; a brake chamber 6 which acts to permit the front wheels 1 and 2 to generate brake force; wheel speed sensors 9 and 10 for detecting a wheel speed of a pair of rear wheels 7 and 8 each acting as a drive wheel; modulators 11 and 12 arranged for adjusting a brake pressure of the rear wheels 7 and 8; brake chambers 13 and 14 acting to permit the rear wheels 7 and 8 to generate brake force; a dual brake valve 16 of which operation is controlled by a brake pedal 15; traction solenoid valves (hereinafter also referred to as "TRC" valves) each comprising a solenoid valve and kept open at the time of traction control (TRC) to feed compressed air in an air tank 17 to the modules 11 and 12 for the rear wheels 7 and 8; a governor actuator 21 for actuating a governor link 20 adapted to vary and set a lower limit value of an engine speed of an engine E; and an ABS/TRC control unit (Hereinafter also referred to as "ABS/TRC ECU") 22 for controlling the modules 5, 11 and 12, traction solenoid valves 18 and 19, and governor actuator 21. In FIG. 2, reference numeral 23 designates an accelerator pedal.

Thus, the ABS/TRC system shown in FIG. 2 is constructed into a four-sensor and three- channel control systems wherein four such wheel speed sensors 3, 4, 9 and 10 are provided for the two front wheels and two rear wheels, respectively, and the single modulator 5 is arranged common to the front wheels 1 and 2 and each one modulator is provided for each of the rear wheels 7 and 8.

The ABS/TRC system of FIG. 2 constructed as described above is so operated that a wheel speed signal is fed from each of the wheel speed sensors 3, 4, 9 and 10 to the ABS/TRC ECU 22. Then, the ABS/TRC ECU 22 carries out operation based on the thus fed wheel speed signal during braking. As a result, when the ABS/TRC ECU 22 judges that the wheels tend to skid, it feeds a control signal to each of the modulators 5, 11 and 12 corresponding to the wheels tending to skid. This results in the modulators 5, 11 and 12 adjusting a brake pressure in the brake chambers 6, 13 and 14 to eliminate the tendency of skid of the wheels. Thus, the ABS/TRC ECU 22 carries out antiskid brake control to eliminate the tendency of wheel locking when the tendency of wheel locking tends to occur during braking.

Also, during an increase in propulsion of the vehicle at the time of start or quick acceleration of the vehicle, the ABS/TRC ECU 22 carries out operation depending on the wheel speed signal fed thereto from each of the wheel speed sensors 3, 4, 9 and 10. As a result, when the ABS/TRC ECU 22 judges that the rear wheels 7 and 8 each acting as a drive wheel tend to slip, it feeds a control signal to each of the modulators 11 and 12 and TRC valves 18 and 19 corresponding to the rear wheels 7 and 8 tending to slip, as well as to the governor actuator 21 for actuating the governor link 20.

The control signal thus fed causes the TRC valves 18 and 19 to be open, so that compressed air may be fed from the air tank 17 through the TRC valves 18 and 19, double check valves 24 and 25, and modulators 11 and 12 to the brake chambers 13 and 14, leading to braking of the rear wheels 7 and 8 that tend to slip. This results in the tendency of slipping of the rear wheels 7 and 8 being eliminated.

An example of TRC due to such braking of the drive wheels is shown in FIG. 3.

In FIG. 3, the TRC is kept non controlled at time T0, therefore, a brake pressure is not generated, so that braking of the rear wheels 7 and 8 does not occur. At time T1, when the ABS/TRC ECU 22 judges that a wheel speed of the rear wheels 7 and 8 on a low μ side relative to a vehicle speed exceeds a predetermined threshold to cause the rear wheels 7 and 8 on the low μ side to tend to slip, it feed the TRC valves 18 and 19 with a control signal. The control signal thus fed from the ABS/TRC ECU 22 to the TRC valves 18 and 19 causes the rear wheels 7 and 8 on the low μ side to be turned on, to thereby brake the rear wheels 7 and 8 that tend to slip. Thus, the TRC due to braking is started. For a predetermined of time after starting of the braking, a relatively long build pulse is out put to a holding solenoid valve (not shown) of each of the modulators 11 and 12 for the purpose of removal of hysteresis in a brake system to repeat on off operation of the holding solenoid valves. At time T2, a slow increase in brake pressure is started. A plurality of rates at which such a slow increase in brake pressure is carried out is set depending on the amount of slipping of the drive wheels or the magnitude of a road surface μ. When the tendency of slipping the wheels tends to reduce, the holding solenoid valve of each of the modulators 11 and 12 is turned on at time T3 and concurrently an exhaust solenoid valve (not shown) of each of the modulators 11 and 12 is turned off or kept turned on for a short period of time, so that the brake pressure is kept or reduced, resulting in a degree of recovering of the wheels being monitored. Start of the vehicle is carried out under such conditions. When the amount of slipping of the wheels is considerably reduced, the brake pressure is further decreased at time T4. When such a decrease in brake pressure causes the amount of slipping of the rear wheels 7 and 8 to be gradually increased again, a slow increase in brake pressure is started at time T5 in view of the tendency of slipping of the rear wheels 7 and 8, to thereby adjust the brake pressure. Then, depending on the tendency of slipping of the drive wheels, holding of the brake pressure or a decrease in brake pressure is carried out at time T6 in the same manner as that at time T3 described above. When the tendency of slipping of the rear wheels 7 and 8 is eliminated, the TRC valves 18 and 19 are turned off at time T8 to interrupt feed of air from the air tank 17. Concurrently, the modulators 11 and 12 are kept actuated to discharge a pressure remaining in a piping system. Then, the modulators 11 and 12 are turned off at time T9 after a predetermined time elapses, resulting in the TRC being terminated.

The above-described control signal output from the ABS/TRC ECU 22 also causes the governor actuators 21 to rotate to adjust the governor 20 of the engine E, so that the engine E is subject to control for speed reduction or deceleration. Such deceleration of the engine E causes rotational driving force of the rear wheels 7 and 8 to be restrained, resulting in the tendency of slipping of the rear wheels that tend to slip being eliminated. Also, the engine E is subject to control for deceleration at the time of TRC due to braking of the rear wheels 7 and 8 as well, so that a lower limit value of an engine speed of the engine E is adjusted or changed to a lower limit value thereof obtained at the time of somewhat increased TRC so as to prevent any engine trouble from occurring at the time of TRC due to braking of the rear wheels 7 and 8.

An example of TRC due to such deceleration of the engine is shown in FIG. 4.

In the TRC due to deceleration of the engine, when the rear wheels 7 and 8 tend to slip after start of the vehicle begins at time t0, the ABS/TRC ECU 22 detects the tendency of slipping of the wheels to feed the governor actuator 21 with a control signal at time t1. This results in deceleration of the engine starting at a low deceleration rate. However, when a revolving speed of a drive shaft that indicates an average speed between the rear wheels 7 and 8 exceeds an allowable level at time t2, deceleration of the engine E is carried out at a full deceleration rate. When the tendency of slipping of the wheels is decreased, deceleration of the engine E is gradually released at time t3. In other words, the engine is accelerated at a low acceleration rate. In this instance, the engine E is subject to quick acceleration depending on the amount of slipping of the wheels and a degree of deceleration of the drive shaft that indicates an average of deceleration between the rear wheels 7 and 8. When the tendency of slipping of only one of the rear wheels 7 and 8 is increased again under such conditions, corresponding one of the TRC valves 18 and 19 is turned on at time t4 to brake the one of the rear wheels that tends to slip and start deceleration of the engine. This causes the tendency of slipping of the one of the rear wheels 7 and 8 to be decreased. However, when this causes the tendency of slipping of the other of the rear wheels 7 and 8 to be concurrently reduced, there is a possibility that the engine causes any engine trouble. In order to avoid the problem, the engine E is subject to quick acceleration at time t5. When such quick acceleration of the engine E causes the tendency of slipping of the rear wheels to be increased again, the engine is subject to quick deceleration again at time t6. In this instance, the engine is subject to low deceleration depending on a degree of acceleration of the drive shaft indicating an average of acceleration between rear wheels 7 and 8 and the amount of slipping of the rear wheels. Then, when the wheel speed of each of the rear wheels 7 and 8 tends to reduce, the engine E is subject to slow acceleration at time t7. A degree of the slow acceleration is calculated on the basis of an internal integration value of a deceleration indication value and the internal integration value is calculated on the basis of behavior of the wheels and a deceleration indication value previously obtained. Thus, the TRC is carried out until the tendency of slipping of the rear wheels 7 and 8 is eliminated.

As described above, the ABS/TRC ECU 22 carries out the TRC due to braking of the drive wheels and the TRC due to deceleration of the engine so as to eliminate the tendency of slipping of the drive wheels or rear wheels 7 and 8 when they tend to slip. Also, the ABS/TRC ECU 22 is adapted to light a traction pilot lamp 26 during the TRC to inform a driver of the TRC when it is being carried out.

In the above-described conventional TRC due to control of the engine and braking of the drive wheels, the engine control in a normal state is carried out in a manner different from that at the time of TRC. Such change of the engine control is carried out by changing adjustment of the governor of the engine. For the change of adjustment of the governor, it is required to adjust the governor link 20 at the time of mounting of the ABS/TRC system on the vehicle or maintenance of the vehicle.

Adjustment of the governor link conventionally takes place in such a manner to connect a switch and a harness to the ABS/TRC ECU 22 and turn on the switch to externally input a signal to the ABS/TRC ECU 22, resulting in an operator executing adjustment of a governor link system while keeping a predetermined position servo signal fed from the ABS/TRC ECU 22 to the governor actuator 21.

Unfortunately, the above described conventional way of adjusting the governor link is disadvantageous in that the adjustment is highly deteriorated in workability and requires skill, resulting in being highly troublesome, because it is required to connect the switch and harness to the ABS/TRC ECU 22 every time when the adjustment takes places and it is required to carry out the adjustment while keeping the engine actuated. Also, the adjustment requires a specific switch, as well as a specific harness.

SUMMARY OF THE INVENTION

The present invention has been made in view of the foregoing disadvantage of the prior art.

Accordingly, it is an object of the present invention to provide a method for adjusting a governor actuator in a traction control system that is capable of facilitating adjustment of a governor link and improving workability without any specific parts and skill for adjustment.

In accordance with the present invention, a method for adjusting a governor actuator in a traction control system is provided which is adapted to carry out positional adjustment of a governor link by means of a governor actuator for actuating the governor link so that a lower limit value of an engine speed of an engine of a vehicle during traction control carried out when a control unit detects the tendency of slipping of drive wheels based on a wheel speed signal fed thereto from each of wheel speed sensors exceeds an engine speed of the engine during slipping of the engine. The method comprises the steps of previously storing data on a stroke position of the governor actuator corresponding to a control position of the governor link during the traction control in a memory arranged in the control unit before the traction control system is mounted on the vehicle and input an adjustment indicating signal to the control unit after the traction control system is mounted on the vehicle, to thereby permit the control unit to actuate the governor actuator to adjust the control position of the governor actuator during the traction control and store the thus-adjusted control position of the governor actuator during the traction control in the memory.

In a preferred embodiment of the present invention, the method of the present invention further comprises the steps of causing the control unit to actuate the governor actuator when the adjustment indicating signal is applied to the control unit, to thereby recognize a mechanical actuation range of the governor actuator corresponding to an actuation range of the governor link and store the thus-recognized mechanical actuation range in the memory; causing the control unit to add the amount of offset of the governor actuator depending on the vehicle which is one of the data on the stroke position of the governor actuator previously stored in the memory to a lower limit position of the mechanical actuation range corresponding to a lower limit value of the actuation range of the governor link, to thereby determine a stroke lower limit position of the governor actuator during the traction control corresponding to a servo position of the governor link during maximum deceleration and store the thus determined stroke lower limit position of the governor actuator in the memory; and causing the control unit to add the amount of effective stroke of the governor actuator during the traction control depending on the vehicle which is the other of the data on the stroke position of the governor actuator to the stroke lower limit position, to thereby determine a stroke upper limit position of the governor actuator during the traction control corresponding to a servo position of the governor link during minimum deceleration and store the thus-determined stroke upper limit position in the memory.

In a preferred embodiment of the present invention, the method of the present invention further comprises the step of causing the control unit to set a standby position that is defined forward of an upper limit position of the mechanical actuation range in a predetermined amount and at which the governor link stands by during non-actuation of the traction control and store the thus-set standby position in said memory.

In a preferred embodiment of the present invention, the method of the present further comprises the step of providing a warning through a warning unit mounted on the vehicle until the adjustment indicating signal is input to the control unit after the traction control system is mounted on the vehicle. In a preferred embodiment of the present invention, the method of the present invention further comprises the step of providing a warning through a warning unit mounted on the vehicle irrespective of input of the adjustment indicating signal to the control unit when the vehicle is mounted thereon with the control unit that is not previously stored therein with any control data on the governor actuator.

In a preferred embodiment of the present invention, the method of the present invention further comprises the step of lighting, when the adjustment indicating signal is input to the control unit, a traction pilot lamp mounted on the vehicle and constructed so as to be lighted during the traction control and putting out the traction pilot lamp when adjustment of the control position of the governor actuator during the traction control is completed and storing of the thus-completed adjustment of the control position in the memory is completed.

In the present invention constructed as described above, when an operator applies the adjustment indicating signal to the control unit after the traction control system is mounted on the vehicle, the control unit actuates the governor actuator. Also, the control unit adjusts the control position of the governor actuator at the time of TRC depending on the data stored in the memory and stores the thus-adjusted control position in the memory thereof. Positional control of the governor link at the time of TRC is carried out depending on the control position of the governor actuator at the time of TRC stored in the memory.

Thus, the present invention permits adjustment of the governor link to be facilitated by merely applying the adjustment indicating signal to the control unit. This results in manhours required for the adjustment being substantially reduced and permits the adjustment to be readily accomplished without any skill.

Also, the present invention may be positively and readily accommodated to any configuration of the engine and governor link by merely changing a program of the control unit.

Further, the present invention, as described above, is so constructed that the warning unit such as a warning lamp generates a warning after the control unit is mounted on the vehicle. In this instance, when the adjustment indicating signal is input to the control unit for adjustment of the governor actuator, generation of the warning from the warning unit is interrupted. This results in the warning unit generating a warning unless adjustment for the governor actuator is executed after mounting of the control unit on the vehicle, so that the present invention effectively prevents an operator from forgetting the adjustment operation.

Furthermore, the present invention, as described above, is constructed in the manner that when a defective control unit that fails to have the data on the stroke position of the governor actuator previously stored therein is mounted on the vehicle, the warning unit such as a warning lamp or the like mounted on the vehicle generates a warning. The warning unit generates a warning also when the adjustment indicating signal is input to the control unit. Thus, an operator may be positively informed of the fact that the defective control unit is mounted on the vehicle.

Moreover, in the present invention, when the adjustment indicating signal is input to the control unit, the traction pilot lamp is lighted. Then, the traction pilot lamp is put out when stroke adjustment of the governor actuator is completed and storing of data on the thus-completed stroke adjustment in the memory is completed. This results in an operator being positively informed of the fact that the governor actuator is under adjustment.

Still other objects and advantages of the invention will in part be obvious and will in part be apparent from the specification.

The invention accordingly comprises the features of construction, combination of elements, and arrangement of parts that will be exemplified in the construction hereinafter set forth, and the scope of the invention will be indicated in the claims.

BRIEF DESCRIPTION OF THE BRIEF DESCRIPTION

DETAILED DESCRIPTION OF THE PREFERRED EMBODIMENT

Now, an embodiment of the present invention will be described hereinafter with reference to the accompanying drawings.

Figure 1:
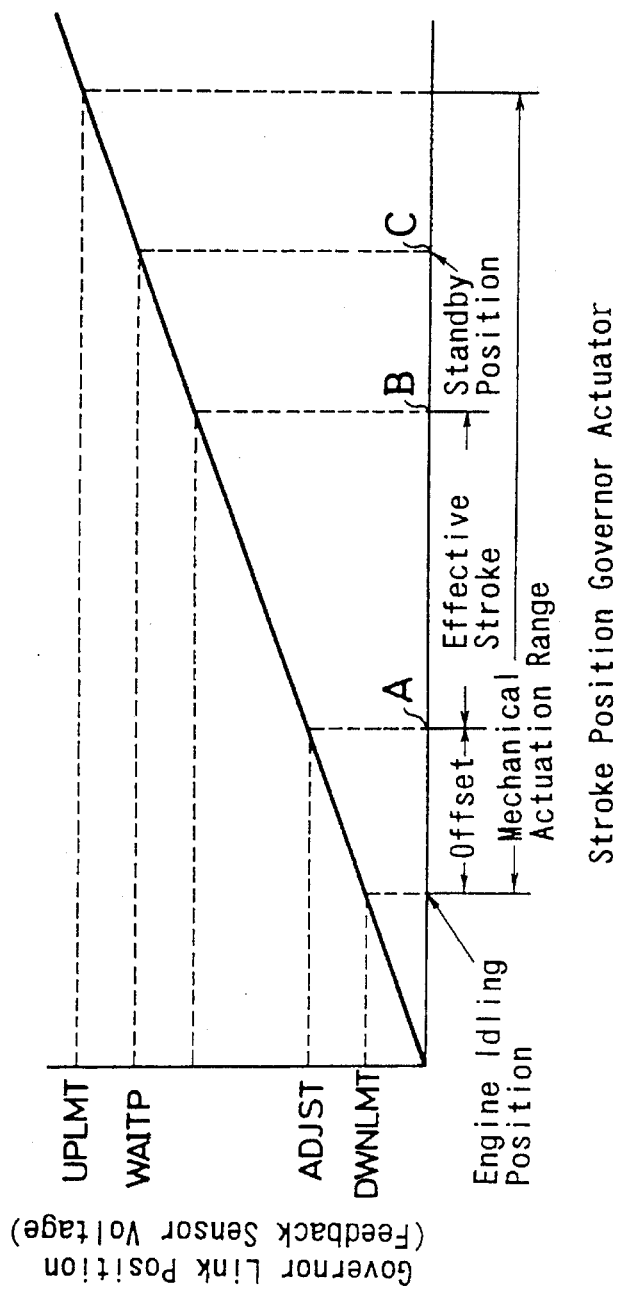
FIG. 1 is a graphical representation showing an embodiment of a method for adjusting a governor actuator in a traction control system according to the present invention.

Referring to FIG. 1, an embodiment of a method for adjusting a governor actuator in a traction control system according to the present invention is illustrated. The following description will be made with reference to reference numerals used for indicating the parts or components of the prior art in FIG. 2.

In a method of the illustrated embodiment, data on the amount of offset of a stroke position of a governor actuator 21 corresponding to a control position of a governor link 20 at the time of TRC depending on a vehicle on which an ABS/TRC system is to be mounted, data on the amount of effective stroke of the governor actuator, and data on a standby position thereof are previously stored in a memory of an ABS/TRC ECU 22 prior to shipment. Then, after the ABS/TRC ECU 22 is mounted on a vehicle, an operator applies an adjustment indicating signal to the ABS/TRC ECU 22, so that it actuates the governor actuator 21 and stores a control position of the governor actuator at the time of TRC depending on the above-described data on the stroke position of the governor actuator 21 previously stored therein.

Figure 2:
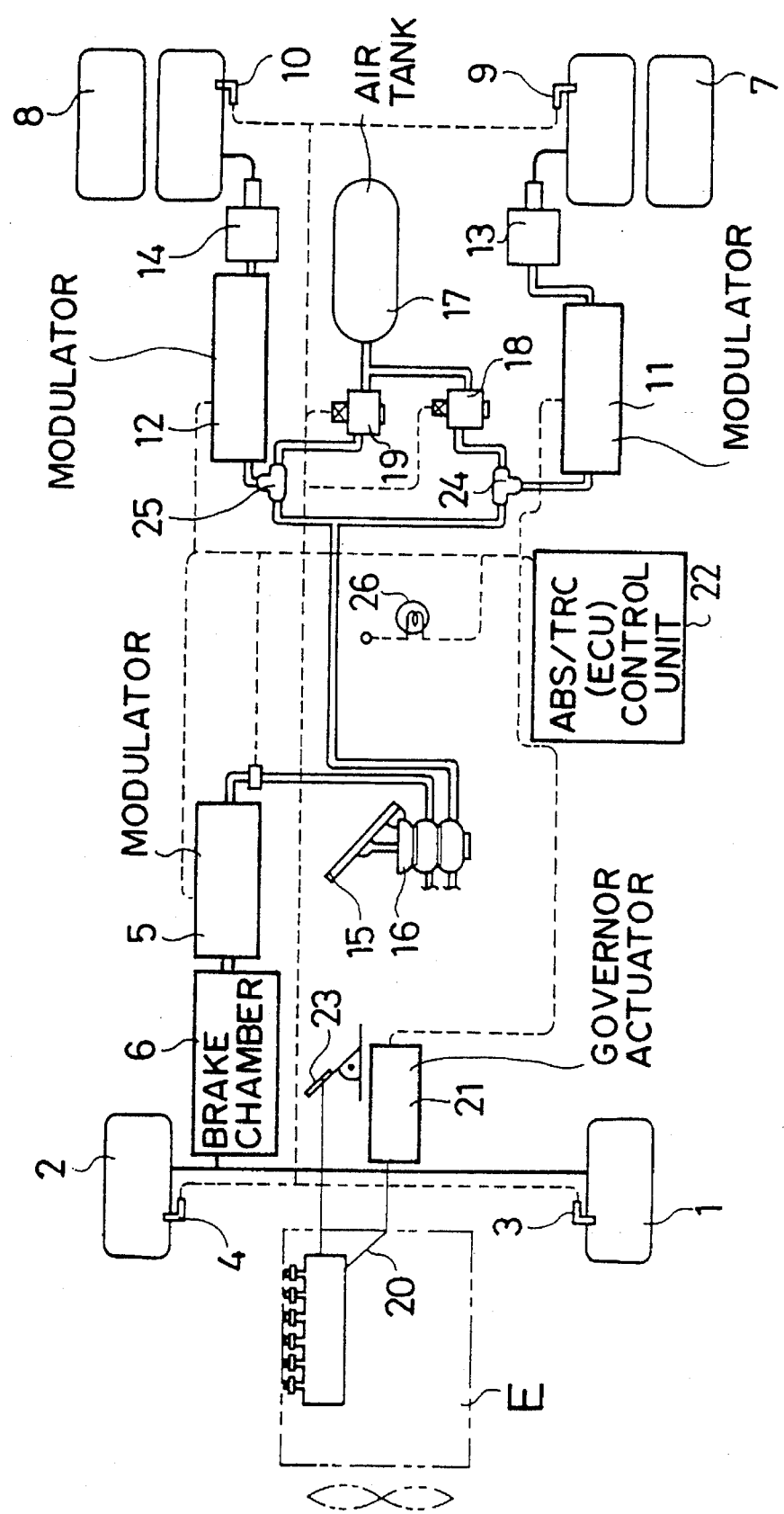
FIG. 2 is a schematic view showing a conventional ABS/TRC system.
Figure 3:
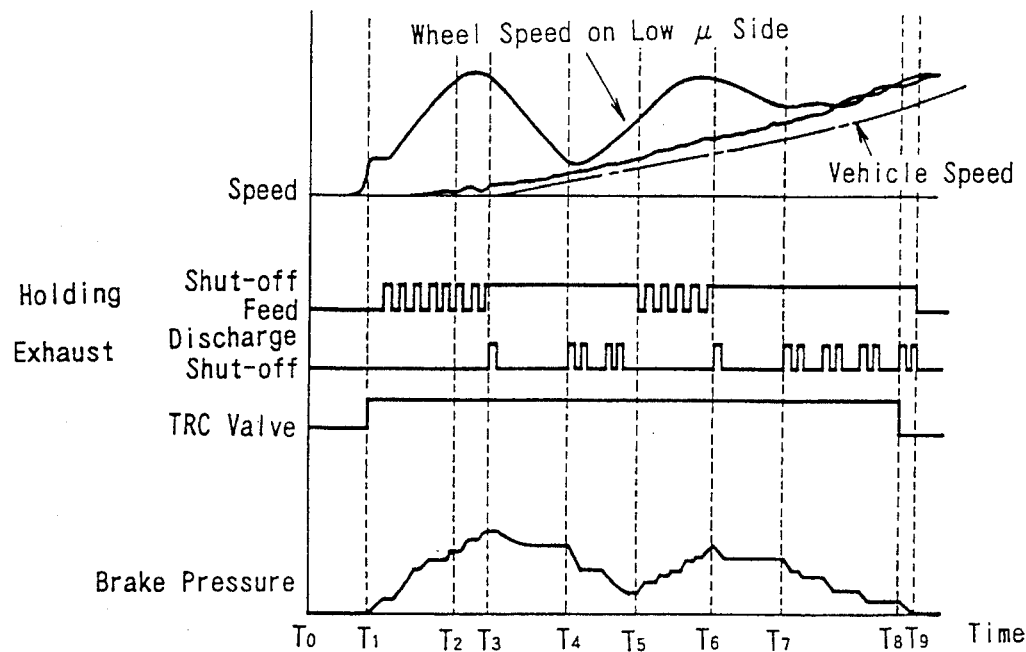
FIG. 3 is a graphical representation showing a manner of TRC due to braking which has been conventionally carried out.
Figure 4:
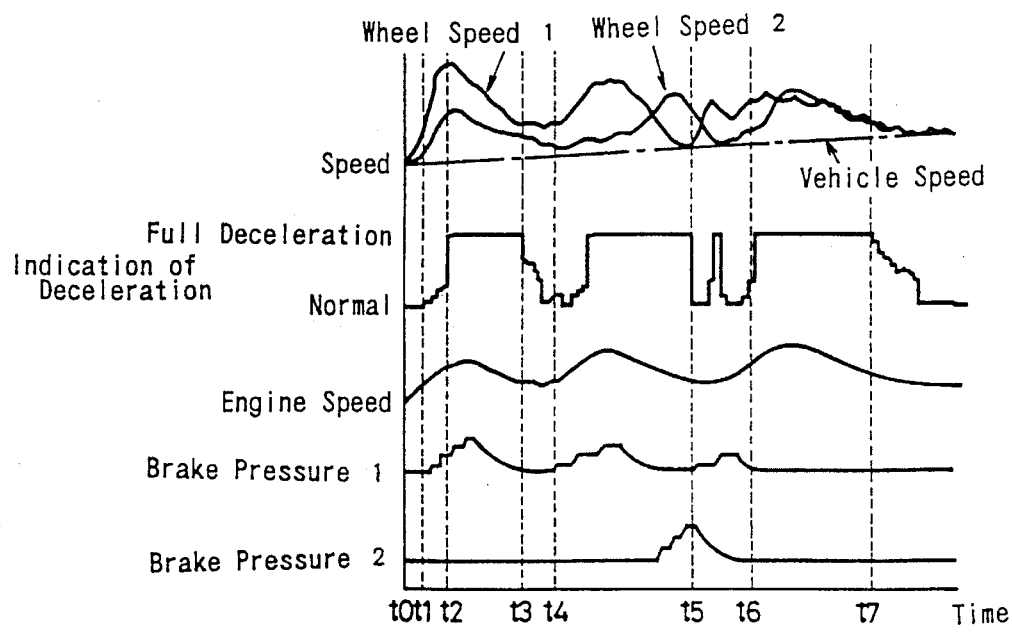
FIG. 4 is a graphical representation showing a manner of TRC due to braking which has been conventionally carried out.

Now, storing of the control position of the governor actuator at the time of TRC in the ABS/TRC ECU 22 will be described hereinafter. First, an adjustment indicating signal is fed to the ABS/TRC ECU 22, so that when it identifies that the signal input thereto is an adjustment indicating signal, it feeds the governor actuator 21 with a drive control signal to reciprocate the governor actuator 21. This results in the ABS/TRC ECU 22 recognizing a mechanical actuation range of the governor actuator 21 which corresponds to a range between a mechanical actuation lower limit position or DWNLMT which is an engine slipping position of the governor link and a mechanical actuation upper limit position UPLMT, as shown in FIG. 2. More specifically, the mechanical actuation range of the governor actuator 21 is recognized by a feedback sensor voltage corresponding to each of the DWNLMT and UPLMT of the governor link 20.

Further, the ABS/TRC ECU 22 sets a stroke lower limit position A of the governor actuator 21 by adding the amount of offset of the governor actuator 21 indicated by a parameter corresponding to the data on the vehicle which are previously stored therein to the lower limit position of the mechanical actuation range of the governor actuator 21 corresponding to the DWNLMT of the governor link 20, to thereby determine a servo position or ADJST of the governor link 20 during maximum deceleration at the time of TRC corresponding to the stroke lower limit position A of the governor actuator 21. The ADJST of the governor 20 at the time of TRC is recognized by the feedback sensor voltage.

Then, the ABS/TRC ECU 22 sets a stroke upper limit position B of the governor actuator 21 by adding the amount of effective stroke of the governor actuator 21 indicated by the parameter corresponding to the data on the vehicle previously stored therein to the stroke lower limit position A, to thereby determine a servo position of the governor link 20 during minimum deceleration at the time of TRC corresponding to the stroke upper limit position B of the governor actuator 21. Further, the ABS/TRC ECU 22 sets a position defined forward of the UPLMT of the governor link 20 in a predetermined amount as a standby position or WAITP of the governor link 20, so that a stroke position of the governor actuator 21 corresponding to the WAITP of the governor link 20 thus set is set as a standby position C of the governor actuator 21. The thus-set standby position C of the governor link 21 acts as a target for a servo position at which the governor link 20 stands by during non-actuation of TRC due to engine control. The servo position of the governor link 20 during the minimum deceleration and its WAITP each are likewise recognized by the feedback sensor voltage.

The data on the positional control of the governor actuator 21 determined according to the successive adjustment procedures described above are stored in the form of a feedback sensor voltage in an electrically erasable EEPROM arranged in the ABS/TRC ECU 22.

In the ABS/TRC system of the illustrated embodiment constructed as described above, the ABS/TRC ECU 22 is previously stored in the memory thereof with positional data depending on the vehicle before it is mounted on the vehicle. Then, when an operator applies the adjustment indicating signal to the ABS/TRC ECU 22 after the ABS/TRC system is mounted on the vehicle, the ABS/TRC ECU 22 actuates the governor actuator 21 to confirm the mechanical actuation range of the governor actuator 21, to thereby set a control position of the governor actuator at the time of TRC based on the data previously stored in the memory of the ABS/TRC ECU 22 and store the thus-set control position in the EEPROM of the ABS/TRC ECU 22. This results in the ABS/TRC ECU 22 controlling the governor actuator 21 based on the control position data stored in the memory of the EEPROM during TRC control.

Also, the ABS/TRC ECU system of the present invention is so constructed that in the case of failing to previously store the data in the memory of the ABS/TRC ECU 22, the ABS/TRC ECU 22 lights a warning unit such as a warning lamp or the like provided on the vehicle to announce a warning to an operator at the time when the operator applies the adjustment indicating signal to the ABS/TRC ECU 22 after the ABS/TRC system is mounted on the vehicle.

Furthermore, the ABS/TRC system is constructed in such a manner that when a power supply of the system is turned on after the system is mounted on the vehicle, the ABS/TRC ECU 22 lights the warning lamp on the vehicle and puts out the lamp when the operator applies the adjustment indicating signal to the ABS/TRC ECU 22 to adjust the governor actuator 21, to thereby cause the control position of the governor actuator to be stored in the memory of the EETX-PROM. Such construction permits the system of the illustrated embodiment to announce a warning to an operator when adjustment of the governor actuator 21 is not carried out.

In addition, when an operator applies the adjustment indicating signal to the ABS/TRC ECU 22, it carries out positional adjustment of the governor actuator 21 and lights a traction pilot lamp 26. Also, when the data on the control position of the governor actuator 21 are stored in the memory of the EEPROM, resulting in the adjustment being completed, the ABS/TRC ECU 22 puts out the traction pilot lamp 26. This permits an operator to confirm whether the governor actuator is under adjustment or the adjustment has been completed.

As described above, in the illustrated embodiment, adjustment of the control position of each of the governor actuator 21 and governor link 20 takes place by mean of the ABS/TRC ECU 22, therefore, adjustment of the control position may be readily accomplished because it is merely required that an operator applies the adjustment indicating signal to the ABS/TRC ECU 22. Also, only a change in program of the ABS/TRC ECU 22 permits the system of the illustrated embodiment to be positively and readily accommodated to any configuration of each of the engine and governor link 20.

The illustrated embodiment described above is constructed in the manner that the ABS system and TRC system are incorporated together therein. However, the present invention may be effectively applied to both arrangement of the TRC system independent from the ABS system and arrangement of only the TRC system.

As can be seen from the foregoing, the method for adjusting the governor actuator in the traction control system according to the present invention is so constructed that only application of the adjustment indicating signal to the control unit permits the control unit to carry out adjustment of the governor actuator, resulting in adjustment of the governor link being highly facilitated. This permits manhours required for the adjustment to be significantly reduced and the adjustment to be accomplished without any specific skill and parts. Therefore, workability in the adjustment is substantially improved.

Also, the present invention may be positively and readily accommodated to any configuration of each of the engine and governor link because it is merely required to change a program of the control unit.

Further, the present invention is constructed so that the warning unit announces a warning to an operator unless adjustment of the governor actuator is carried out after the control unit is mounted on the vehicle. Such construction effectively prevents the operator from forgetting the adjustment operation.

Furthermore, the present invention is constructed in the manner that when a defective control unit that fails to be previously stored therein with the data on the stroke adjustment of the governor actuator is mounted on the vehicle, the warning unit such as a warning lamp or the like generates a warning, so that an operator may be positively informed of the fact that the control unit is defective.

Moreover, the present invention permits the traction pilot lamp to be lighted during adjustment of the governor actuator, resulting in an operator being positively informed of the fact that the governor actuator is under adjustment.

What is claimed is:

1. A method for operating a traction control system having wheel speed sensors for generating wheel speed signals of drive wheels, a control unit with a memory, a governor link for varying engine speed, and a governor actuator for controlling said governor link, said control unit detecting a tendency of slipping of said drive wheels when said wheel speed signals received thereby exceeds a vehicle speed during slipping of said drive wheels and controlling said governor actuator to carry out positional adjustment of said governor link so that a lower limit value of said engine speed is used during traction control, wherein said positional adjustment of governor link includes:

providing said memory with initial data matching that of the vehicle on a stroke position of said governor actuator corresponding to a control position of said governor link during the traction control before said traction control system is mounted on said vehicle; and inputting an adjustment indicating signal to said control unit after said traction control system is mounted on said vehicle for permitting said control unit to determine the control position of said governor actuator during the traction control and permanently store the determined position of said governor actuator in said memory as an adjusted control position, to thereby permit said control unit to actuate said governor actuator to adjust the control position of said governor actuator during the traction control and store the thus-adjusted control position of said governor actuator during the traction control in said memory.

2. A method as defined in claim 1, further comprising steps of:

causing said control unit to actuate said governor actuator when said adjustment indicating signal is applied to said control unit, to thereby reciprocate said governor and determine a mechanical actuator range of said governor actuator corresponding to an actuation range of said governor link and store then thus-determined mechanical actuation range in said memory;

causing said control unit to add an amount of offset of said governor actuator depending on the vehicle which is one of said data on the stroke position of said governor actuator previously stored in said memory to a lower limit position of said mechanical actuation range corresponding to a lower limit value of said actuation range of said governor link, to thereby determine a stroke lower limit position of said governor actuator during the traction control corresponding to a servo position of said governor link during maximum deceleration and store the thus-determined stroke lower limit position of said governor actuator in said memory; and causing said control unit to add an amount of effective stroke of said governor actuator during the traction control depending on the vehicle which is the other of said dam on the stroke position of said governor actuator to said stroke lower limit position, to thereby determine a stroke upper limit position of said governor actuator during the traction control corresponding to a servo position of said governor link during minimum deceleration and store the thus-determined stroke upper limit position in said memory.

3. A method as defined in claim 2, further comprising a step of causing said control unit to set a standby position that is defined forward of an upper limit position of said mechanical actuation range in a predetermined amount and at which said governor link stands by during non-actuation of the traction control and store the thus-set standby position in said memory.

4. A method as defined in claim 3, further comprising a step of providing a warning through a warning unit mounted on the vehicle until said adjustment indicating signal is input to said control unit after said traction control system is mounted on the vehicle.

5. A method as defined in claim 3, further comprising a step of providing a warning through a warning unit mounted on the vehicle irrespective of input of said adjustment indicating signal to said control unit when the vehicle is mounted thereon with said control unit that is not previously stored therein with any control data on said governor actuator.

6. A method as defined in claim 3, further comprising a step of lighting, when said adjustment indicating signal is input to said control unit, a traction pilot lamp mounted on the vehicle and constructed so as to be lighted during the traction control and putting out said traction pilot lamp when adjustment of the control position of said governor actuator during the traction control is completed and storing of the thus completed adjustment of said control position in said memory is completed.

7. A method as defined in claim 2, further comprising a step of providing a warning through a warning unit mounted on the vehicle until said adjustment indicating signal is input to said control unit after said traction control system is mounted on the vehicle.

8. A method as defined in claim 2, further comprising a step of providing a warning through a warning unit mounted on the vehicle irrespective of input of said adjustment indicating signal to said control unit when the vehicle is mounted thereon with said control unit that is not previously stored therein with any control data on said governor actuator.

9. A method as defined in claim 2, further comprising a step of lighting, when said adjustment indicating signal is input to said control unit, a traction pilot lamp mounted on the vehicle and constructed so as to be lighted during a traction control and putting out said traction pilot lamp when adjustment of the control position of said governor actuator during the traction control is completed and storing of the thus completed adjustment of said control position in said memory is completed.

10. A method as defined in claim 1, further comprising a step of providing a warning through a warning unit mounted on the vehicle until said adjustment indicating signal is input to said control unit after said traction control system is mounted on the vehicle.

11. A method as defined in claim 10, further comprising a step of providing a warning through a warning unit mounted on the vehicle irrespective of input of said adjustment indicating signal to said control unit when the vehicle is mounted thereon with said control unit that is not previously stored therein with any control data on said governor actuator.

12. A method as defined in claim 10, further comprising a step of lighting, when said adjustment indicating signal is input to said control unit, a traction pilot lamp mounted on the vehicle and constructed so as to be lighted during the traction control and putting out said traction pilot lamp when adjustment of the control position of said governor actuator during the traction control is completed and storing of the thus completed adjustment of said control position in said memory is completed.

13. A method as defined in claim 1, further comprising a step of providing a warning through a warning unit mounted on the vehicle irrespective of input of said adjustment indicating signal to said control unit when the vehicle is mounted thereon with said control unit that is not previously stored therein with any control data on said governor actuator.

14. A method as defined in claim 13, further comprising a step of lighting, when said adjustment indicating signal is input to said control unit, a traction pilot lamp mounted on the vehicle and constructed so as to be lighted during the traction control and putting out said traction pilot lamp where adjustment of the control position of said governor actuator during the traction control is completed and storing of the thus completed adjustment of said control position in said memory is completed.

15. A method as defined in claim 1, further comprising a step of lighting, when said adjustment indicating signal is input to said control unit, a traction pilot lamp mounted on the vehicle and constructed so as to be lighted during the traction control and putting out said traction pilot lamp when adjustment of the control position of said governor actuator during the traction control is completed and storing of the thus-completed adjustment of said control position in said memory is completed.

16. A method for operating a traction control system having wheel speed sensors for generating wheel speed signals of drive wheels, a control unit with a memory, a governor link for varying engine speed, and a governor actuator for controlling said governor link, said control unit detecting a tendency of slipping of said drive wheels when said wheel speed signals received thereby exceeds a vehicle speed during slipping of said drive wheels and controlling said governor actuator to carry out positional adjustment of said governor link so that a lower limit value of said engine speed is used during traction control, wherein said positional adjustment of governor link includes:

providing said memory with initial dam matching that of the vehicle on a stroke position of said governor actuator corresponding to a control position of said governor link during the traction control before said traction control system is mounted on said vehicle;

inputting an adjustment indicating signal to said control unit after said traction control system is mounted on said vehicle for permitting said control unit to determine the control position of said governor actuator during the traction control and permanently store the determined position of said governor actuator in said memory as an adjusted control position, to thereby permit said control unit to actuate said governor actuator to adjust the control position of said governor actuator during the traction control and store the thus-adjusted control position of said governor actuator during the traction control in said memory, causing said control unit to actuate said governor actuator when said adjustment indicating signal is applied to said control unit, to thereby reciprocate said governor and determine a mechanical actuator range of said governor actuator corresponding to an actuation range of said governor link and store then thus-determined mechanical actuation range in said memory;

causing said control unit to add an amount of offset of said governor actuator depending on the vehicle which is one of said data on the stroke position of said governor actuator previously stored in said memory to a lower limit position of said mechanical actuation range corresponding to a lower limit value of said actuation range of said governor link, to thereby determine a stroke lower limit position of said governor actuator during the traction control corresponding to a servo position of said governor link during maximum deceleration and store the thus-determined stroke lower limit position of said governor actuator in said memory; and causing said control unit to add an amount of effective stroke of said governor actuator during the traction control depending on the vehicle which is the other of said data on the stroke position of said governor actuator to said stroke lower limit position, to thereby determine a stroke upper limit position of said governor actuator during the traction control corresponding to a servo position of said governor link during minimum deceleration and store the thus-determined stroke upper limit position in said memory.

* * * * *